United States Patent
Jo et al.

[11] Patent Number: 5,982,759
[45] Date of Patent: Nov. 9, 1999

[54] METHOD FOR GENERATING DUMMY FREQUENCIES FOR FREQUENCY HARD HANDOVER IN CODE DIVISION MULTIPLE ACCESS MOBILE COMMUNICATION SYSTEM

[75] Inventors: Young-ho Jo; Chang-yeon Kim, both of Seoul; Jong-tae Chung, Kyonggi-do, all of Rep. of Korea

[73] Assignee: Shinsegi Telecomm, Inc., Seoul, Rep. of Korea

[21] Appl. No.: 08/988,935

[22] Filed: Dec. 11, 1997

[30] Foreign Application Priority Data

Dec. 28, 1996 [KR] Rep. of Korea ............... 96-75216

[51] Int. Cl.$^6$ ..................................................... H04Q 7/00
[52] U.S. Cl. ............................................. 370/331; 370/335
[58] Field of Search ................................. 455/111, 436, 455/439, 443, 444; 370/331, 332, 342, 335; 375/200

[56] References Cited

U.S. PATENT DOCUMENTS 5,345,601  9/1994  Takagi ........................................ 455/59
5,594,718  1/1997  Weaver ..................................... 370/331
5,805,575  9/1998  Kamin ...................................... 370/335

*Primary Examiner*—Chau Nguyen
*Assistant Examiner*—Thinh Vu
*Attorney, Agent, or Firm*—Birch, Stewart, Kolasch & Birch, LLP

[57] ABSTRACT

A method for generating dummy frequencies to make frequency hard handover smooth in provision of a digital CDMA mobile communication service when base stations are different in frequency configuration. The coverage of each of the dummy frequencies becomes the same as that of a service frequency using basic signals of the service frequency. According to the present invention, a pilot channel signal, a sync channel signal, a paging channel signal and traffic channel signals of the service frequency are placed directly on each of the dummy frequencies. Therefore, the coverage of the dummy frequency can always become the same as that of the service frequency which is varied according to a traffic amount of the base station, so that a mobile station can perfectly perform the frequency hard handover. Further, one power combiner, one power amplifier and one power divider are provided to process all of the dummy frequencies. Therefore, a dummy frequency generation circuit can become simple in construction and be reduced in cost. Also, the system reliability is enhanced.

18 Claims, 2 Drawing Sheets

METHOD FOR GENERATING DUMMY FREQUENCIES FOR FREQUENCY HARD HANDOVER IN CODE DIVISION MULTIPLE ACCESS MOBILE COMMUNICATION SYSTEM

BACKGROUND OF THE INVENTION

1. Field of the Invention

The present invention relates in general to a method for generating dummy frequencies to enable a smooth frequency hard handover in a digital code division multiple access (CDMA) mobile communication service when base stations are configured for different frequencies, and more particularly to a dummy frequency generation method for making the coverage of a dummy frequency the same as that of a service frequency using basic signals of the service frequency.

2. Description of the Prior Art

In a Code Division Multiple Access (CDMA) system, a service frequency includes a plurality of channels which are identified according to codes. A forward link from a base station to a mobile station is composed of pilot, sync, paging and traffic channels. The pilot channel transmits information allowing the mobile station to acquire the system and identify the base station. The coverage of the base station is determined according to a ratio of chip energy of the pilot channel to interference density.

The interference density is determined based on the sum of power of the sync, paging and traffic channels and ambient noise power of the mobile station. For this reason, the coverage of a base station varies according to a power ratio of the channels in the service frequency and a traffic load.

In mobile communication systems such as cellular, personal communications service satellite mobile communications and future public land mobile telecommunications systems, handover must be performed to maintain a call when a mobile station passes through the boundary between base stations. Particularly, in a CDMA mobile communication system, when service frequencies of two base stations are the same in number and value, a call can be continuously maintained by soft handover with no frequency conversion. However, when the service frequencies of the two base stations are not the same in number, a frequency conversion may be required to maintain the call, with an engaged mobile station which is called "frequency hard handover".

When the service frequencies of the handover target base station are smaller in number than those of the adjacent base station, the handover target base station adds dummy frequencies or pilot beacons to service frequencies to make the number of the frequencies the same as that of the adjacent base station. In this manner, a mobile station using a frequency other than the service frequency of the handover target base station obtains information of the handover target base station to perform frequency hard handover. At this time, each dummy frequency is composed of a part or all of a pilot channel signal, a sync channel signal and paging channel signals. Here, the term "dummy frequency" represents all of pilot beacons or dummy pilots, each of which transmits only the pilot channel signal and dummy frequencies, each of which is composed of a part or all of the pilot channel signal, sync channel signal and paging channel signals.

FIG. 1 is a block diagram illustrating the construction of a system for performing a conventional dummy frequency generation method. The base station is provided with a service frequency with traffic channels and dummy frequencies with no traffic channel. The service frequency includes a pilot channel signal $A_1$, a sync channel signal $B_1$, a paging channel signal $C_1$ and traffic channel signals $D_1$–$D_N$. Channel elements 1–5 perform digital signal processes including frequency spreading, respectively, with respect to the pilot channel signal $A_1$, sync channel signal $B_1$, paging channel signal $C_1$ and traffic channel signals $D_1$–$D_N$. The processed signals are combined by a power combiner 6 and converted into a radio frequency signal $F_1$ by a transmitter/receiver unit 7. Then, the radio frequency signal $F_1$ is amplified by a linear amplifier 8 and supplied to an antenna (not shown). Here, the pilot channel signal $A_1$, sync channel signal $B_1$, paging channel signal $C_1$ and traffic channel signals $D_1$–$D_N$ are adjusted in gain by the channel elements 1–5. The pilot channel signal $A_1$, sync channel signal $B_1$ and paging channel signal $C_1$ are typically maintained at gains set upon initialization of the base station. However, the traffic channel signals $D_1$–$D_N$ are dynamically varied in gain to maintain a call quality depending on a variation in traffic amount. As a result, the base station coverage, or a ratio of chip energy of the service frequency pilot channel to noise density, is varied.

For the smooth frequency hard handover, a handover target base station must have N–1 dummy frequencies in addition to one service frequency when the adjacent base station has N service frequencies. Each dummy frequency is the same in construction as the service frequency, with the exception that it has no traffic channel signal. Pilot, sync and paging channel signals of the first dummy frequency are processed respectively by channel elements 9–11. Similarly to those in the service frequency, the processed signals are combined by a power combiner 12 and converted into a radio frequency signal $F_2$ by a transmitter/receiver unit 13. Then, the radio frequency signal $F_2$ is amplified by the linear amplifier 8 together with the radio frequency signal $F_1$ of the service frequency and supplied to the antenna. Channel elements 14–16 correspond to the N–1th dummy frequency. Similarly, pilot, sync and paging channel signals of the N–1th dummy frequency are processed respectively by the channel elements 14–16. The processed signals are combined with a power combiner 17 and converted into a radio frequency signal $F_N$ by a transmitter/receiver unit 18. Then, the radio frequency signal $F_N$ is amplified by the linear amplifier 8 together with the radio frequency signal $F_1$ of the service frequency and the radio frequency signal $F_2$ of the first dummy frequency and supplied to the antenna.

In the above-mentioned conventional system, the coverage of the service frequency $F_1$ is determined according to a pilot chip energy-to-noise density ratio at the output of the power combiner 6. The noise density is determined based on the sum of power of the sync B1 and paging C1 channel signals from the channel elements 2 and 3 and power of the traffic channel signals from the channel elements 4, . . . , 5. For this reason, the coverage of the service frequency $F_1$ is varied depending on a load amount on the traffic channels. However, the coverage of each of the dummy frequencies $F_2$, . . . , $F_N$ is determined according to a pilot chip energy-to-interference density ratio at the output of a corresponding one of the power combiner 12, . . . , 17. The interference density is determined based on power of the sync and paging channel signals from corresponding ones of the channel elements 10 and 11, . . . , 15 and 16. As a result, the coverage of the dummy frequency is always constant, an necessarily different from the varying coverage of the service frequency.

In other words, the coverage of each of the dummy frequencies must be the same as that of the service frequency to make frequency hard handover smooth. However, when the coverage of a dummy frequency of a handover target base station is larger than that of a service frequency thereof, a handover executing mobile station receives the signal of the dummy frequency of the handover target base station at the boundary of the dummy frequency coverage of the handover target base station and changes it communication frequency to the service frequency of the target base station. In this case, a call is dropped because the service frequency coverage of the handover target base station is small. Also, because the dummy frequency coverage of the handover target base station is extremely large, the interference to the adjacent base stations is increased, resulting in a reduction in the coverage of a service frequency of the adjacent base stations. On the other hand, when the coverage of the dummy frequency of the handover target base station is smaller than that of the service frequency thereof, the handover executing mobile station cannot obtain information of the handover target base station at the boundary of the service frequency coverage of the adjacent base station. As a result, the frequency hard handover cannot be performed.

SUMMARY OF THE INVENTION

Therefore, the present invention has been made in view of the above problems, and it is an object of the present invention to provide a dummy frequency generation method for placing a pilot channel signal, a sync channel signal, a paging channel signal and traffic channel signals of a service frequency directly on each dummy frequency to always make the coverage of the dummy frequency the same as that of the service frequency which is varied according to a traffic amount of a base station, so that a mobile station can perfectly perform frequency hard handover.

In accordance with one aspect of the present invention, there is provided a method for generating dummy frequencies for frequency hard handover in a code division multiple access mobile communication system, comprising the steps of combining a pilot channel signal, a sync channel signal, and a paging channel signal and at least one of traffic channel signals, where the pilot, sync, paging, and traffic channel signals are associates with a service frequency; generating a plurality of second signals by dividing the first signal; converting one of the plurality of second signals into a signal of the service frequency; and converting the remaining second signals into signals of the dummy frequencies.

In accordance with another aspect of the present invention, there is provided a code division multiple access mobile communication system comprising a first plurality of base stations, a switching center operatively coupled to each of the first plurality of base stations for controlling traffic channels allocated to the base stations, and a second plurality of mobile stations movable into and out of coverage areas of the base stations, wherein a first base station operates at a first traffic channel frequency and a second base station utilizes a second traffic channel frequency which is different from the first traffic channel frequency, the system further comprising means at the second base station for generating a signal of a dummy frequency equal to the first traffic channel frequency by using at least one of a pilot channel signal, a sync channel signal, and a paging channel signal together with at least one of traffic channel signals, wherein the pilot, sync, paging, and traffic channel signals are associated with the second traffic channel frequency and wherein coverage of the dummy frequency is substantially the same as coverage of the second traffic channel frequency; means at the mobile station for detecting intensity of the signal of the dummy frequency to determine whether the detected intensity exceeds a predetermined threshold; means at the mobile station for transmitting a prescribed signal to the switching center via the first base station when the detected intensity is determined to exceed the predetermined threshold; means at the switching center for determining whether any traffic channel of the second base station is available; power-combining the third and fourth signals; and converting the power-combined signal into a signal of the dummy frequency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
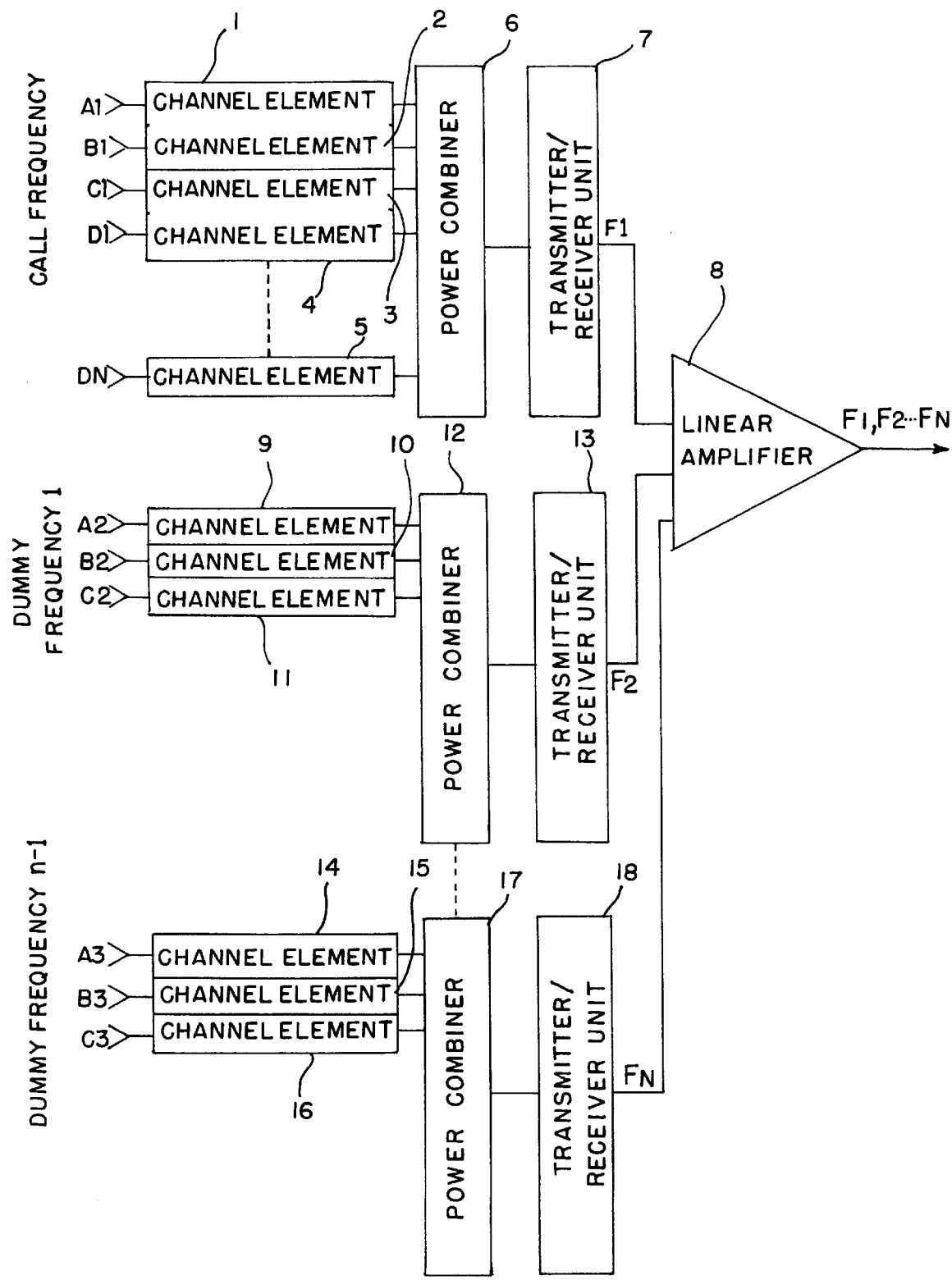
FIG. 1 is a block diagram illustrating the construction of a system for performing a conventional dummy frequency generation method.
Figure 2:
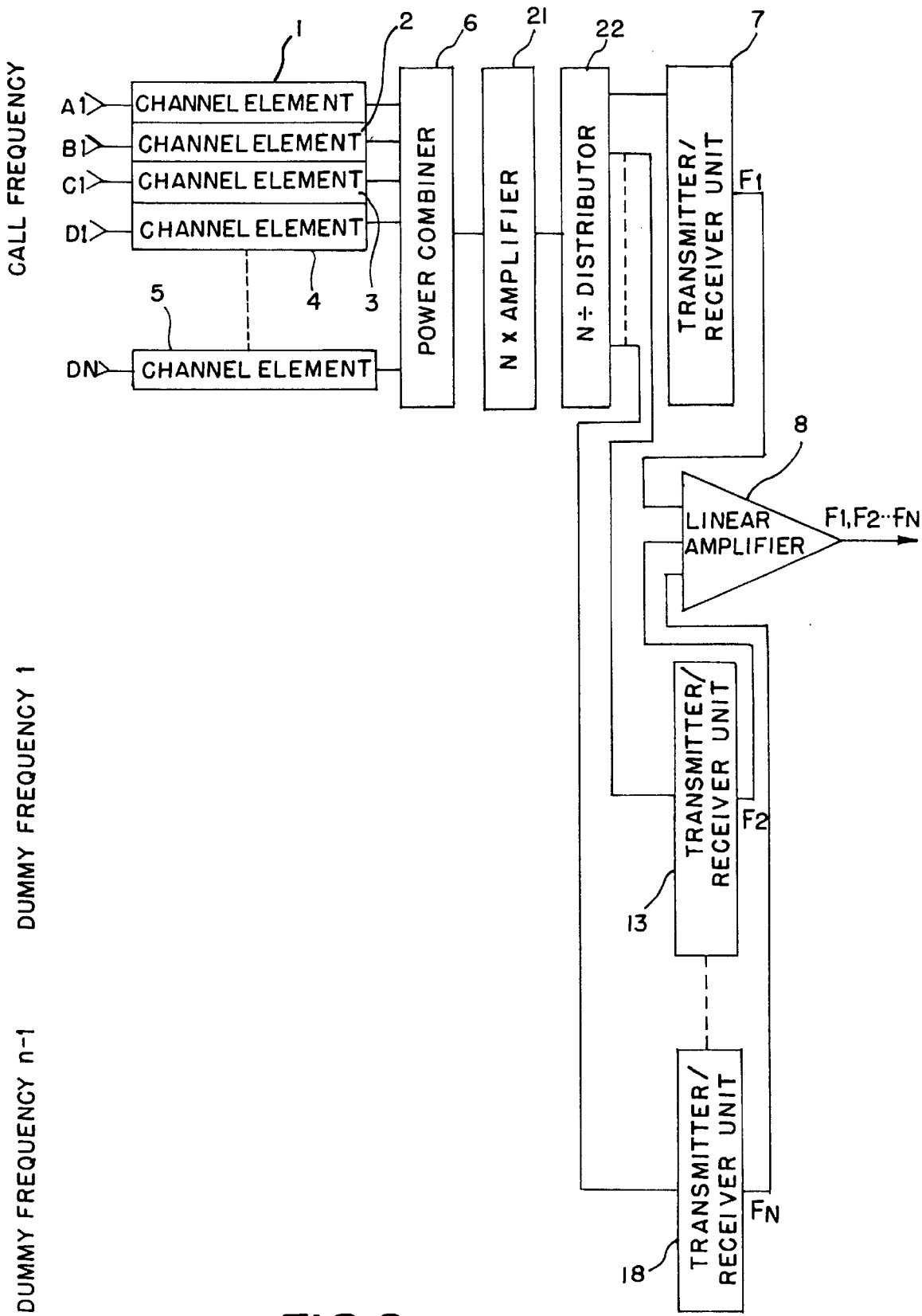
FIG. 2 is a block diagram illustrating the construction of a system for performing a dummy frequency generation method in accordance with the present invention.

FIG. 2 is a block diagram illustrating the construction of a system for performing a dummy frequency generation method in accordance with the present invention. A service frequency includes at least one of a pilot channel signal $A_1$, a sync channel signal and $B_1$, a paging channel signal $C_1$ and traffic channel signals $D_1$–$D_N$. Channel elements 1–5 perform digital signal processes including frequency spreading, and the pilot channel signal $A_1$, sync channel signal $B_1$, paging channel signal $C_1$ and traffic channel signals $D_1$–$D_N$. The processed signals are combined by a power combiner 6 and applied to a transmitter/receiver unit 7 through a power amplifier 21 and a power divider 22. The transmitter/receiver unit 7 converts the received signal into a radio frequency signal $F_1$ of the service frequency which is then amplified by a linear power amplifier 8 and supplied to an antenna (not shown).

The power divider 22 is adopted to divide the combined signal of the service frequency from the power combiner 6 into N signals and supply the divided N signals as input signals to the transmitter/receiver unit 7 for the service frequency and transmitter/receiver units 13, . . . , 18 for dummy frequencies. The power amplifier 21 is adopted to amplify the combined signal of the service frequency from the power combiner 6 by N times so that the output signals from the power divider 22 can be the same in level as the output signal from the power combiner 6.

The first output signal from the power divider 22 is supplied to the transmitter/receiver unit 7 for the service frequency and the remaining N−1 output signals from the power divider 22 are supplied respectively to the transmitter/receiver units 13, . . . , 18 for the dummy frequencies. Each of the transmitter/receiver units 13, . . . , 18 for the dummy frequencies converts the received signal into a radio frequency signals of the dummy frequencies which is then amplified by the linear power amplifier 8 and supplied to the antenna together with the radio frequency signal $F_1$ of the service frequency. Namely, the second output signal from the power divider 22 is converted into a radio frequency signal $F_2$ by the transmitter/receiver unit 13 and then applied to the linear power amplifier 8. Also, the Nth output signal from the distributor 22 is converted into a radio frequency signal $F_N$ by the transmitter/receiver unit 18 and then applied to the power linear amplifier 8. As a result, radio frequency signals $F_1, F_2, \ldots, F_N$ of the same power rate are obtained from the linear power amplifier 8, each of which includes the pilot channel signal, sync channel signal, paging channel signal and call channel signals.

Although the dummy frequency generation method has been disclosed for illustrative purpose, the present invention is not limited thereto. For example, the present invention may be applied to a pilot beacon generation method.

As apparent from the above description, the present invention provides the method for generating the dummy frequencies for the frequency hard handover in the CDMA mobile communication system. In the conventional dummy frequency generation method, the dummy frequencies, each of which is composed of at least one of the pilot channel signal, sync channel signal and paging channel signals, are used to transmit only base station information. However, in the present dummy frequency generation method, at least one of the pilot channel signal, sync channel signal, and paging channel signal and at least one of traffic signal signals, wherein the pilot, sync, paging and traffic channel signals are associated with a service frequency are placed directly on each of the dummy frequencies. Therefore, the coverage of the dummy frequencies can always become the same as that of the service frequency which is varied according to a traffic amount of the base station, so that the mobile station can perfectly perform the frequency hard handover.

Further, in the conventional dummy frequency generation method, the plurality of channel elements and the power combiner are provided to process the pilot channel signal, sync channel signal and paging channel signal of every dummy frequency. However, in the present dummy frequency generation method, one power combiner, one power amplifier and one power divider are provided to process all of the dummy frequencies. Therefore, the dummy frequency generation circuit can become simple in construction and can be reduced in cost. Also, the system reliability is enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for generating dummy frequencies for frequency hard handover in a code division multiple access mobile communication system, comprising:
   generating a first signal by power-combining at least one of a pilot channel signal, a sync channel signal, and a paging channel signal with at least one of traffic channel signals, wherein the pilot, sync, paging and traffic channel signals are associated with a service frequency;
   generating a plurality of second signals by power dividing the first signal;
   converting one of the plurality of second signals into a signal of the service frequency; and
   converting the remaining second signals into signals of the dummy frequencies.

2. The method recited by claim 1, further comprising the step of power-amplifying the first signal.

3. A method of generating a dummy frequency for frequency hard handover in a code division multiple access mobile communication system, comprising the steps of:

generating a first signal by power-combining at least one of a pilot channel, a sync channel signal, and a paging channel signal with at least one of traffic channel signals, wherein the pilot, sync, paging and traffic channel signals are associated with a service frequency;
   generating a plurality of second signals by power-dividing the first signal; and
   converting at least one of the plurality of second signals into a signal of the dummy frequency.

4. The method recited by claim 3, further comprising the step of power-amplifying the first signal.

5. A method of generating a dummy frequency for frequency hard handover in a code division multiple access mobile communication system, comprising the steps of:
   generating a first group of signals by power-dividing at least one of a pilot channel signal, a sync channel signal, and a paging channel signal, wherein the pilot, sync, and paging channel signals are associated with a service frequency;
   generating a second group of signals by power-dividing a traffic channel signal, wherein the traffic channel signal is associated with the service frequency;
   selecting third and fourth signals from the first and second groups of signals, respectively;
   power-combining the third and fourth signals; and
   converting the power-combined signal into a signal of the dummy frequency.

6. The method recited by claim 5, further comprising the step of power-amplifying the combined signal.

7. An apparatus for generating a dummy frequency for frequency hard handover in a code division multiple access mobile communication system, comprising:
   means for generating a first signal by power-combining at least one of a pilot channel signal, a sync channel signal, and a paging channel signal with at least one of traffic channel signals, wherein the pilot, sync, paging and traffic channel signals are associated with a service frequency;
   means for generating a plurality of second signals by power-dividing the first signal; and
   means for converting at least one of the plurality of second signals into a signal of the dummy frequency.

8. The apparatus recited by claim 7, further comprising means for converting the remaining second signals into a signal of the service frequency.

9. The apparatus recited by claim 7, further comprising means for power-amplifying the first signal.

10. The apparatus recited by claim 8, further comprising means for power-amplifying the first signal.

11. In a code division multiple access mobile communication system comprising a first plurality of base stations, a switching center operatively coupled to each of the first plurality of base stations for controlling traffic channels allocated to the first plurality of base stations, and a second plurality of mobile stations movable into and out of coverage areas of the base stations and operatively coupled to the base stations, a method for performing frequency hard handover when a mobile station operatively coupled to a first base station which utilizes a first traffic channel frequency moves from the coverage area of the first base station to the coverage area of a second base station which utilizes a second traffic channel frequency is different from the first traffic channel frequency, the method comprising the steps of:
   at the second base station, generating a signal of a dummy frequency equal to the first traffic channel frequency by using at least one of pilot channel signal, a sync channel signal, and a paging channel signal together with at least one of traffic channel signals, wherein the pilot, sync, paging and traffic channel signals are associated with the second traffic channel frequency and wherein coverage of the dummy frequency is substantially the same as coverage of the second traffic channel frequency;

at the mobile station, detecting an intensity of the signal of the dummy frequency to determine whether the detected intensity is above a predetermined threshold;

at the mobile station, transmitting a prescribed signal to the switching center via the first base station when the detected intensity is determined to be above the predetermined threshold; and at the switching center, allocating the available traffic channel of the second base station to the mobile station in response to reception by the switching center of the prescribed signal.

12. The method recited by claim 11, wherein the step of generating a signal of a dummy frequency includes the sub-steps of:

generating a third signal by power-combining at least one of a pilot channel signal, a sync channel signal, and a paging channel signal with at least one of traffic channel signals;

generating a plurality of fourth signals by power-dividing the third signal; and converting at least one of the plurality of fourth signals into a signal of a dummy frequency.

13. The method recited by claim 11, wherein the step of generating a signal of a dummy frequency further includes the sub-step of power-amplifying the third signal.

14. The method recited by claim 12, wherein the step of generating a signal of a dummy frequency further includes the sub-step of power-amplifying the third signal.

15. A code division multiple access mobile communication system comprising a first plurality of base stations, a switching center operatively coupled to each of the first plurality of base stations for controlling traffic channels allocated to the base stations, and a second plurality of mobile stations movable into and out of coverage areas of the base stations, wherein a first base station operates at a first traffic channel frequency and a second base station utilizes a second traffic channel frequency which is different from the first traffic channel frequency, the system further comprising:

means at the second base station for generating a signal of a dummy frequency equal to the first traffic channel frequency by using at least one of a pilot channel signal, a sync channel signal, and paging channel signal together with at least one of traffic channel signals, wherein the pilot, sync, paging and traffic channel signals are associated with the second traffic channel frequency and wherein coverage of the dummy frequency is substantially the same as coverage of the second traffic channel frequency;

means at the mobile station for detecting intensity of the signal of the dummy frequency to determine whether the detected intensity exceeds a predetermined threshold;

means at the mobile station for transmitting a prescribed signal to the switching center via the first base station when the detected intensity is determined to exceed the predetermined threshold;

means at the switching center for determining whether any traffic channel of the second base station is available; and means at the switching center for allocating the available traffic channel of the second base station to the mobile station in response to reception of the prescribed signal.

16. The system recited by claim 15, wherein the means at the second base station for generating a signal of a dummy frequency includes:

means for generating a third signal by power-combining at least one of a pilot channel signal, a sync channel signal, and a paging channel signal with at least one of traffic channel signals;

means for generating a plurality of fourth signals by power-dividing the third signal; and means for converting at least one of the plurality of fourth signals into the signal of the dummy frequency.

17. The method recited by claim 15, wherein the means at the second base station for generating a signal of a dummy frequency further includes means for power-amplifying the third signal.

18. The method recited by claim 16, wherein the means at the second base station for generating a signal of a dummy frequency further includes means for power-amplifying the third signal.

* * * * *